(12) United States Patent
Hiddink et al.

(10) Patent No.: US 7,898,962 B2
(45) Date of Patent: Mar. 1, 2011

(54) COMMUNICATIONS SYSTEMS WITH RETRANSMISSION REQUEST BUDGETS

(75) Inventors: Gerrit Hiddink, Utrecht (NL); Harald Kampen, Utrecht (NL)

(73) Assignee: Agere Systems Inc., Allentown, PA (US)

( * ) Notice: Subject to any disclaimer, the term of this patent is extended or adjusted under 35 U.S.C. 154(b) by 1542 days.

(21) Appl. No.: 11/079,725

(22) Filed: Mar. 14, 2005

(65) Prior Publication Data

US 2006/0215586 A1    Sep. 28, 2006

(51) Int. Cl.
G08C 15/00    (2006.01)
(52) U.S. Cl. .......................................... 370/236
(58) Field of Classification Search .................. 370/229, 370/230, 232, 235, 236, 237, 282
See application file for complete search history.

(56) References Cited

U.S. PATENT DOCUMENTS

| | | | |
|---|---|---|---|
| 6,879,561 B1 * | 4/2005 | Zhang et al. .................. | 370/235 |
| 7,068,619 B2 * | 6/2006 | Balachandran et al. ...... | 370/328 |
| 7,254,765 B2 * | 8/2007 | Meyer et al. .................. | 714/748 |
| 7,260,785 B2 * | 8/2007 | Ching et al. .................. | 715/769 |
| 7,337,382 B2 * | 2/2008 | Oshita et al. .................. | 714/748 |

OTHER PUBLICATIONS

"Adaption Techniques in Wireless Packet Data Services" by Sanjiv Nanda et al., Telecommunications at the Start of the New Millennium, IEEE Communications Magazine, Jan. 2000, pp. 54-64.

* cited by examiner

*Primary Examiner* — Ricky Ngo
*Assistant Examiner* — Chandrahas Patel
(74) *Attorney, Agent, or Firm* — Mendelsohn, Drucker & Associates, P.C.; David Cargille; Steve Mendelsohn

(57) ABSTRACT

A media communications system using a multicasting or broadcasting technique, where each individual sink is allowed to request retransmissions according to a budget. The media communications system maintains the media quality of sinks that have a good communications channel in situations where one or more of the sinks is experiencing a bad communications channel, and where otherwise the communications channel would be saturated with retransmission requests and retransmissions which would affect other and possibly all media sinks.

14 Claims, 3 Drawing Sheets

COMMUNICATIONS SYSTEMS WITH RETRANSMISSION REQUEST BUDGETS

BACKGROUND OF THE INVENTION

1. Field of the Invention

The present invention relates to communications networks, and more specifically, to retransmission protocols in a multicast environment.

2. Description of the Related Art

There are three primary addressing mechanisms used in communications systems today. These addressing mechanisms are unicasting, multicasting, and broadcasting. Unicasting involves using an address that uniquely identifies a single sink as the destination for a data communication within a communications system. Broadcasting involves using an address that identifies all sinks in the system as destinations for a data communication. Finally, multicasting involves using an address that identifies a group of sinks (typically more than one and less than all of the sinks) in the system as destinations for a data communication.

One advantage common to multicasting and broadcasting is that, with multicast and broadcast addressing, a communication can be sent just once, and yet be received by multiple sinks, thus conserving transmission bandwidth relative to a unicast scheme, where the same communication would need to be sent multiple times to be received by multiple sinks.

In some communication systems (typically referred to as connection-oriented communication systems), a communication from a source to a sink can be retransmitted in the event of lost data (e.g., due to transmission failures that result from, for example, interference or framing errors). In such systems, when unicast addressing is used, as described above, a source sends a communication to a single destination. If the sink receives the communication without error, then the sink acknowledges the receipt of the communication back to the source by sending an acknowledgement message to the source. A sink can detect missing data from an error in a communications sequence numbering, for example, and then send a negative acknowledgement back to the sink. If the source fails to receive an acknowledgement or if the source receives a negative acknowledgmnent, then it will assume the communication failed and the source will typically retransmit the communication to the sink.

For multicast and broadcast addressing, it is less common to use an acknowledgement-and-retransmission scheme due to the amount of traffic that can be generated from acknowledgements and retransmissions when there are a large number of sinks and/or one or more noisy channels in the system. However, in some cases, where the number of multicast recipients is relatively small, an acknowledgement-and-retransmission scheme is desirable as it can provide some degree of error tolerance in noisy environments.

In such situations, however, a problem can arise if one or more of the sinks experience a significantly higher retransmission requirement than the others. This can be due, for example, to some sinks being at a greater distance from the source than are other sinks in a wireless environment, or one or more sinks being on a portion of a network that is exposed to more interference than other portions of the network. In these situations, the one or more sinks that require retransmissions can load down the source and/or network with retransmission requests, affecting the other sinks in the network that would not, otherwise, experience difficulty receiving communications from the source.

Accordingly, there exists a need for retransmission protocols for multicast and broadcast communications network environments that improve transmission efficiency and/or perceived quality of service in the communications networks.

SUMMARY OF THE INVENTION

Problems in the prior art are addressed, in accordance with principles of the present invention, by a method and apparatus for managing the perceived quality of communications within connection-oriented communications networks.

In one embodiment, the present invention is a method for managing bandwidth in a communications network having at least a first source and at least a first sink. A retransmission budget for the first sink is specified. After determining that the first sink did not successfully receive a communication transmitted from the first source, the method determines, based on the retransmission budget, whether to retransmit the communication from the first source to the first sink.

In another embodiment, the present invention is a retransmission budgeting entity (RBE) for managing bandwidth in a communications network having at least a first source and at least a first sink. The RBE is adapted to specify a retransmission budget for the first sink, such that, if the first sink does not successfully receive a communication from the first source, then the first sink receives a retransmission of the communication from the source only if the retransmission would not exceed the retransmission budget.

In yet another embodiment, the present invention is a first sink for a communications network having at least a first source and at least the first sink. The first sink is adapted to (1) determine that the first sink did not successfully receive a communication transmitted from the first source and (2) receive a retransmission of the communication from the first source only if the retransmission would not exceed a specified transmission budget for the first sink.

In still another embodiment, the present invention is a communications network having at least a first source and at least a first sink. A retransmission budget is specified for the first sink. The first sink is adapted to determine (1) that the first sink did not successfully receive a communication transmitted from the first source and (2) whether to retransmit the communication from the first source to the first sink is determined based on the retransmission budget.

BRIEF DESCRIPTION OF THE DRAWINGS

Other aspects, features, and advantages of the present invention will become more filly apparent from the following detailed description, the appended claims, and the accompanying drawings in which:

DETAILED DESCRIPTION

Figure 1:
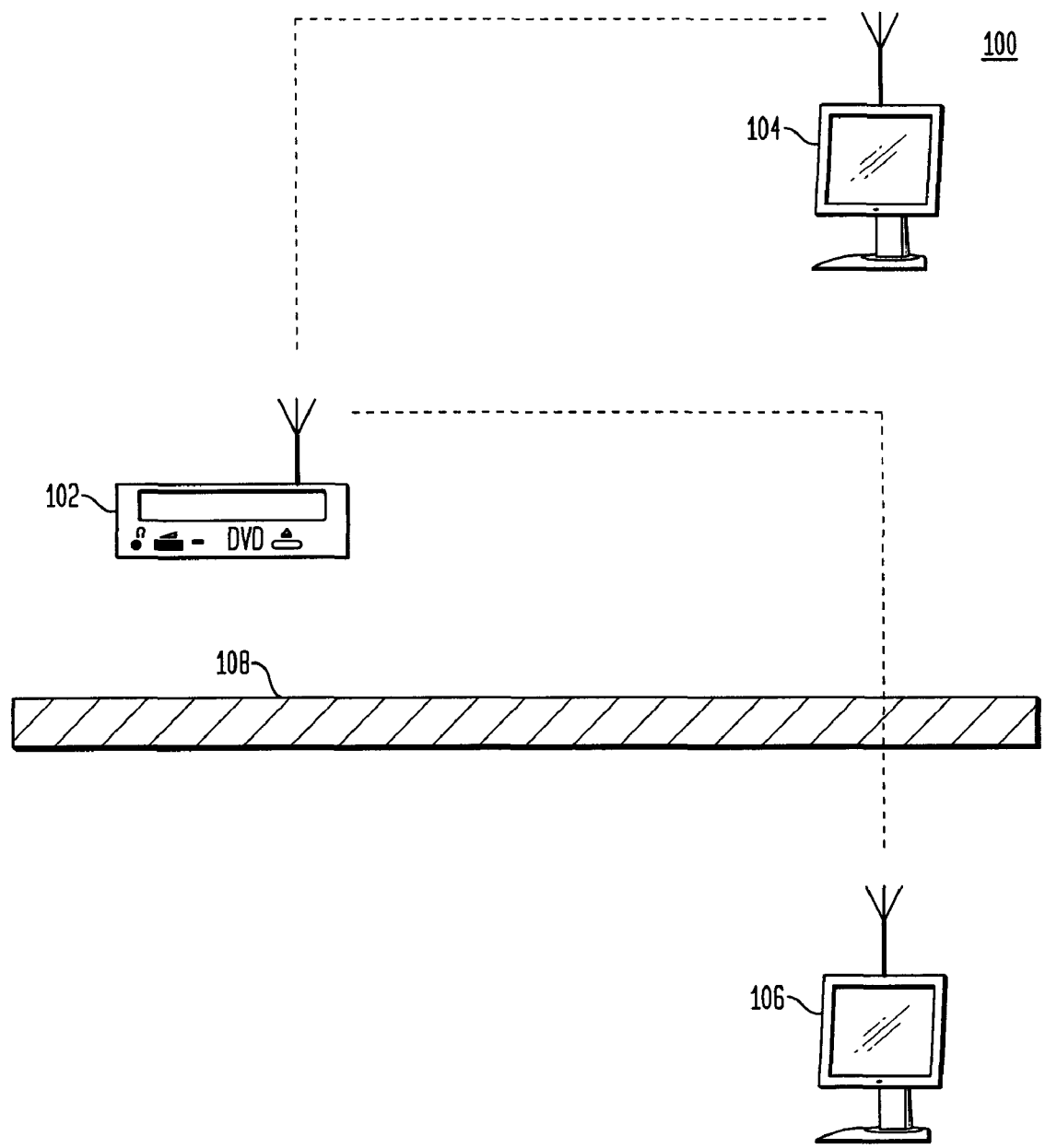
FIG. 1 illustrates exemplary multicast communications network 100 of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Although the present invention is described in the context of communications networks employing multicast addressing mechanisms, embodiments of the present invention can also be implemented in the context of communications networks employing broadcast addressing mechanisms and/or unicast broadcast addressing mechanisms.

Introduction

Most communication systems can detect corrupted or missing frames by using, for example, sequence numbers and/or checksums. One example is the frame-check sequence (FCS) specified by the IEEE 802.11 standard. IEEE 802.11 is described in more detail in IEEE Standard 802.11, 1999 (Re-aff 2003) Edition, "Wireless LAN Medium Access Control (MAC) and Physical Layer (PHY) specifications," Institute of Electrical and Electronics Engineers (IEEE), 2002 (which includes IEEE Std 802.11, 1999 Edition; IEEE Std 802.11a-1999; IEEE Std 802.11b-1999; IEEE Std 802.11b-1999/Cor 1-2001; and IEEE Std 802.11d-2001) (referred to herein collectively as "the IEEE 802.11 standard"), the teachings of all of which are incorporated by reference.

When a corrupted or lost frame is detected by a sink, the sink can request that the source retransmit the frame. This is done by the sink sending a negative acknowledgement to the source, for example, or by not sending a positive acknowledgement when one is expected. In the IEEE 802.11 protocol, for example, an acknowledgement (ACK) frame is specified to start within a given time period following the transmission of a packet. If, by the end of that time period, no start of an ACK frame has been detected, then the source will assume that the frame was corrupted or lost.

Many communications protocols do not support using acknowledgements in combination with multicast addressing because a large number of destinations would produce a large number of acknowledgements and, assuming some channel error, a large number of retransmission requests, potentially significantly affecting the throughput of the channel.

However, for multicast scenarios with a small number of sinks, an efficient mechanism to build a reliable multicast is feasible: each sink is able to request retransmission of a frame, via an explicit negative acknowledgement frame, or implicitly by the absence of a positive acknowledgement. If the number of sinks is small (e.g., on the order of 2 to 5) and the reliability of the link is relatively good, then the number of frames that the source needs to retransmit is moderately low. This also depends on the amount of bandwidth that is available to the system, and the efficiency of the transmitted (negative) acknowledgements. Using a protocol where one bit of a bitmap corresponds to the acknowledgement of one frame (e.g. a block ACK as defined in the IEEE 802.11e standard) is much more efficient than transmitting an acknowledgement message per frame (e.g., the regular ACK mechanism in the IEEE 802.11 standard). More information on 802.11e can be found in IEEE Standard 802.11e/D3.0, May 2002 (Draft Supplement to IEEE Std 802.11, 1999 Edition, "Medium Access Control (MAC) Enhancements for Quality of Service (QoS)"), incorporated herein by reference in its entirety.

However, such a mechanism is not free from problems. For example, if one of the destinations of a transmission is nearing the range limit of a radio system, is behind an object obstructing radio waves, or is otherwise experiencing a lot of radio interference, then it would request an inordinate number of retransmissions and consume an undesirable percentage of available channel bandwidth and/or physical medium access time. This might result in there being insufficient medium time remaining to support an acceptable quality level (e.g., for streaming audio or video) for reception of data by other destinations within the system that are not experiencing any radio errors.

Consider exemplary communications system 100 of FIG. 1. FIG. 1 depicts wireless video source 102, wireless video sinks 104 and 106, and physical room partition 108. In operation, video source 102 multicasts video wirelessly to video sinks 104 and 106. Assume that the medium bandwidth is 16 Mbit/s, and that the video source is transmitting MPEG data taken from a DVD up to a rate of 12 Mbit/s. This would consume 75% of the available medium time, leaving 25% of the medium time available for acknowledgement packets and retransmissions.

Assume further, in a first scenario, that each of video sinks 104 and 106 requires 10% of the available medium time for acknowledgements and retransmissions. Thus, the total percentage of required medium time is 75%+10%+10%=95%. In this first scenario, both video sinks would be able to receive all transmitted data and thus be able to provide a good quality picture.

Consider, however, a second scenario, where video sink 106 experiences more dropped packets (e.g., due to interference caused by room partition 108) than does video sink 104. If the resulting acknowledgement and retransmission requirements of video sink 106 exceed 15% of the available medium time in this second scenario, then both video sinks 104 and 106 will start to be affected and the perceived quality of the system will degrade. Additionally, the system can exhibit the non-intuitive characteristic of degrading the performance of one of the video sinks (in this case, sink 104) that has no reception problems, due to a reception problem (e.g., out of range or obstruction) associated with another of the video sinks in the system (e.g., sink 106).

Budgeting

To remedy the situation just discussed, in certain embodiments of the present invention, retransmission budgets are assigned to sinks in the system. For example, in communications system 100 of FIG. 1, the present invention might limit the allowable retransmission requests of each of video sinks 104 and 106 to 10% of the available bandwidth or medium time. In this case, in the second scenario above, if sink 106 were experiencing an inordinate number of packet errors, then sink 106 would be limited in its ability to request retransmissions beyond the specified 10% limit. Thus, sink 106 might experience degradation in performance (e.g., video or audio dropouts on its display due to dropped packets), but sink 104 would be unaffected.

This "budgeting" can be implemented in a number of different ways (e.g., by setting limits on the number of packet retransmission requests allowed by a sink in a given time period, or by limiting the peak bandwidth usage of a particular sink), in either a centrally or distributed manner (or a combination of both), and statically or dynamically as a function of various characteristics of the devices, medium, and/or desired outcomes. Retry budgets can be specified, for example, (1) as a percentage of the total medium time, (2) as a fixed number of retries per unit time, (3) as a weighted number of retries (e.g., where the weight is a dynamic function of the number of retries for a particular device), and/or (4) as a dynamic function of the system characteristics.

For example, in communications system 100 of FIG. 1, assume video sink 106 features a large, high-resolution display, while video sink 104 has a much smaller, resolutionlimited display. In this scenario, it might be desirable to specify a larger retransmission budget for the sink that features the better display. For example, sink 106 might be given a retransmission (and acknowledgement) budget of 20%, while sink 104 may be given a retransmission budget of only 5%. This may be done even with the knowledge that the 5% may be an insufficient budget (nominally 10% per the first scenario above) to support error-free transmission to sink 104. However, this may be acceptable to the system designer who wants to optimize the quality of the video reception for the sink with the better display (i.e., sink 106). Thus, different sinks can be assigned different "priority levels" for retransmission, where priority is a function of one or more characteristics of the sink and/or the role or application of the network. For example, a multitude of video sinks in an exhibit or conference center may be assigned different priorities based on their location (e.g., higher priority for those sinks that are visible in the main hall relative to those in the bathrooms).

Figure 2:
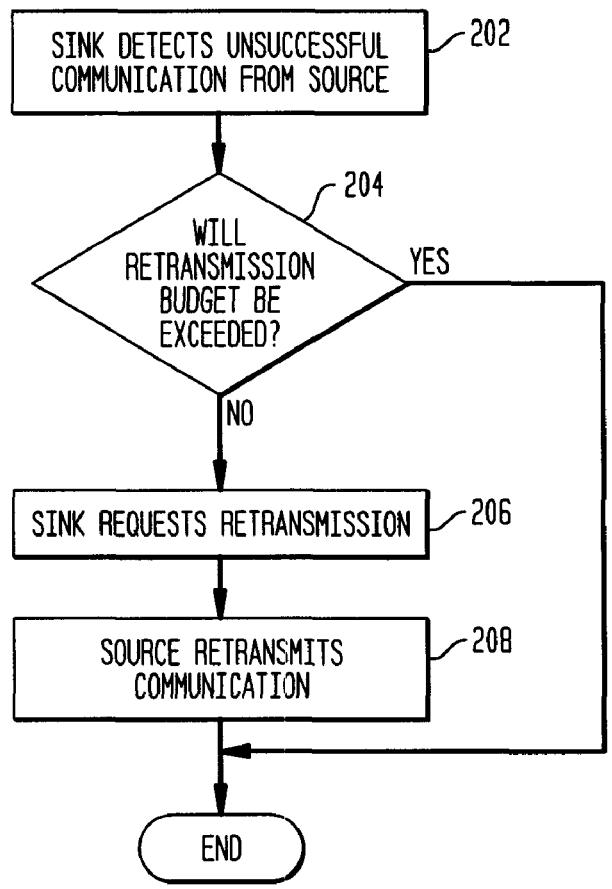
FIG. 2 shows a flow diagram of the processing implemented in a communications network in which each sink is aware of its retransmission budget, according to one embodiment of the present invention.

FIG. 2 shows a flow diagram of the processing implemented in a communications network in which each sink is aware of its retransmission budget, according to one embodiment of the present invention. In particular, a sink detects an unsuccessful communication from a source (step 202 of FIG. 2) and determines whether its retransmission budget will be exceeded if the communication is retransmitted by the source following transmission of a request for retransmission by the sink (step 204). If the retransmission budget can accommodate the retransmission, then the sink transmits a request for retransmission (step 206) and the source retransmits the communication (step 208). If the retransmission budget cannot accommodate the retransmission, then processing terminates.

Dynamics

In one or more embodiments of the present invention, a (centralized or distributed) retransmission budgeting entity (RBE) within the network (e.g., implemented in one or more of nodes 102, 104, and 106 and/or one or more other nodes (not shown in FIG. 1)) dynamically adjusts the budgets of the various sinks in the system, e.g., in order to optimize the throughput of the system for all sinks. For example, consider a system with an anticipated transmission medium time requirement of 75% (similar to the example of FIG. 1). Acknowledgments and retransmissions for all sinks in the system can occupy 25% of the available bandwidth without loss of quality (note that it is assumed here that each sink has sufficient buffering to accommodate any latencies associated with the retransmission delays). In this embodiment, the RBE may initially assign an equal retransmission limit to all N sinks in the system. However, during the course of operation, the RBE may determine that some of the sinks rarely require retransmissions, while others require their specified limit of retransmissions quite often. In this case, the RBE can adjust the retransmission budgets of the various sinks until those sinks that need more retransmissions have a higher retransmission limit and those that need fewer retransmissions have a lower retransmission limit. As an example, the RBE can choose to dynamically adjust retransmission budgets in order to minimize the equation:

$$\sum_{i=1}^{N} (RL_i - RA_i)^2 \quad (1)$$

where $RL_i$ is the retransmission limit specified for the ith sink and $RA_i$ is the actual (e.g., average) retransmission usage empirically measured for the ith sink. Other optimization approaches are applicable as well, as would be understood to one skilled in the art.

In one or more of the above embodiments, the RBE is implemented in one or more of the sources in the system. In one or more other embodiments of the present invention, the RBE function is performed by each of the sinks independently based on monitoring the traffic within the communications system.

Alternatively or additionally, sinks may register their characteristics (e.g., display type, buffer depth, and tolerance to latency) with the RBE, and the RBE can take these factors into account during the process by which budgets are allocated and possibly adjusted. For example, the buffer depth of a particular sink can be used to derive a maximum latency and thereby a maximum retransmission budget for that sink. Additionally, a sink with a large, high-resolution display may be given a slightly larger retransmission budget than a sink with a smaller, low-resolution display.

Figure 3:
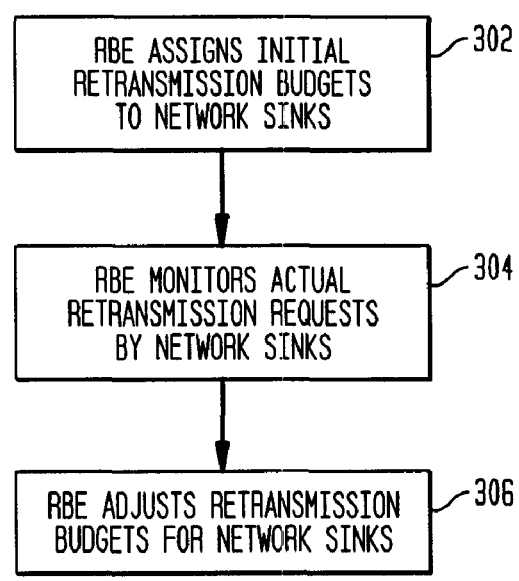
FIG. 3 shows a flow diagram of the processing implemented by a retransmission budgeting entity, according to one embodiment of the present invention.

FIG. 3 shows a flow diagram of the processing implemented by an RBE, according to one embodiment of the present invention. According to this embodiment, the RBE assigns initial retransmission budgets to the various sinks in the network (step 302 of FIG. 3). Depending on the particular implementation, the initial retransmission budgets may all be the same or they may differ, taking into account different sink characteristics. The RBE keeps track of the numbers of actual retransmission requests made by the different sinks (step 304) and then adjusts accordingly the retransmission budgets for one or more of the sinks (step 306), e.g., using Equation (1).

In one or more of the above embodiments or in an alternative embodiment of the present invention, sinks are not explicitly informed of retransmission budgets and are allowed to request retransmissions above and beyond their budget limitations. However, in these embodiments, the retransmission requests that are beyond the retransmission limit of a particular sink are ignored by the source or intercepted by the RBE before they are received by the source and thus do not result in any actual retransmissions. Though this has the negative characteristic of using up bandwidth associated with the retransmission requests themselves, it is still more desirable than flooding the network with the actual retransmissions.

In certain embodiments, if a sink exceeds its retransmission budget in a given period, then the RBE sends a "silence" message to that sink. The sink must obey this "silence" message for the duration of the period before it can again request any retransmissions.

Figure 4:
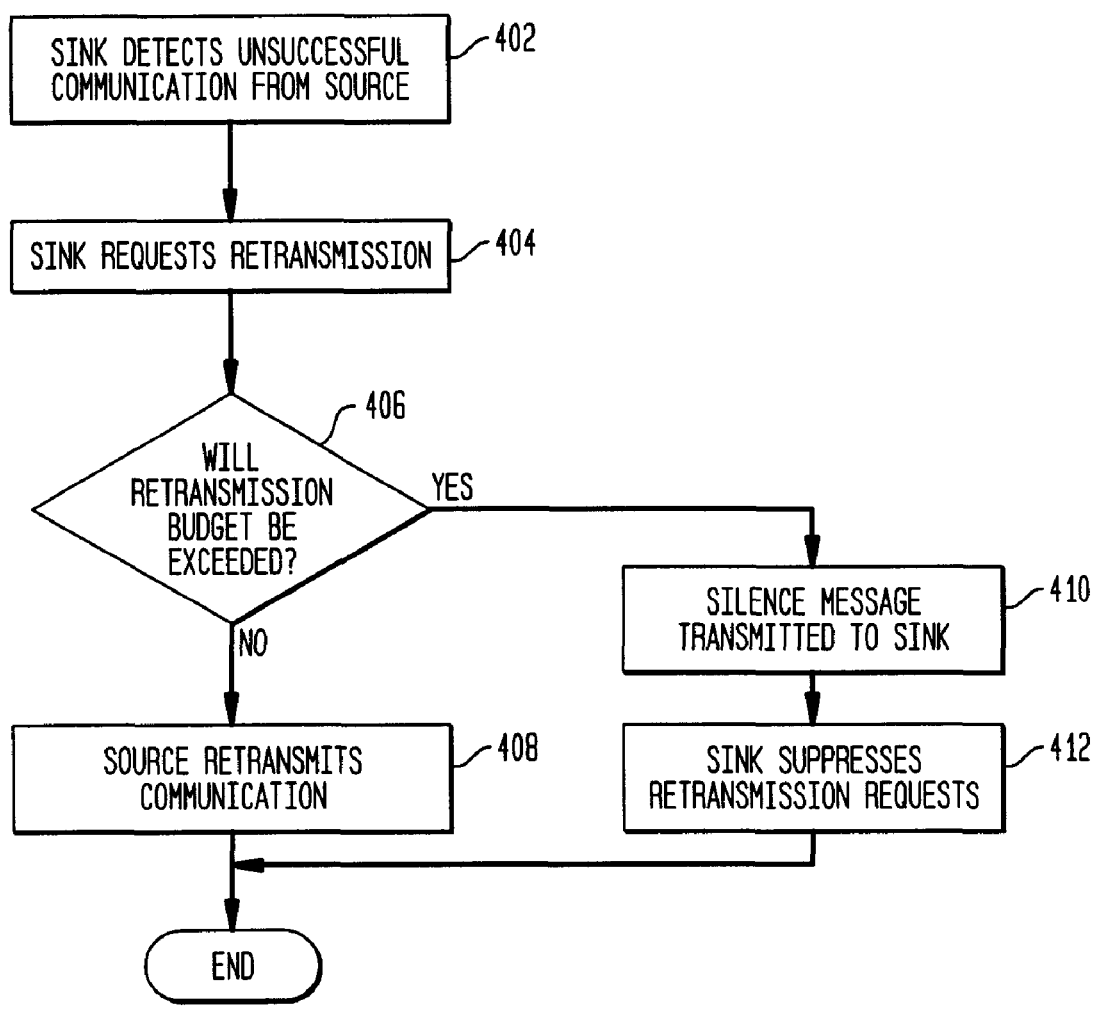
FIG. 4 shows a flow diagram of the processing implemented in a communications network in which each sink is not aware of its retransmission budget, according to one embodiment of the present invention.

FIG. 4 shows a flow diagram of the processing implemented in a communications network in which each sink is not aware of its retransmission budget, according to one embodiment of the present invention. In particular, a sink detects an unsuccessful communication from a source (step 402 of FIG. 4) and transmits a request for retransmission (step 404). The RBE determines that the sink's retransmission budget will be exceeded if the communication is retransmitted (step 406). If the retransmission budget can accommodate the retransmission, then the source retransmits the communication (step 408). If the retransmission budget cannot accommodate the retransmission, then the RBE transmits a silence message to the sink (step 410) and the sink suppresses any additional retransmission requests (step 412), e.g., for a specified time period following receipt of the silence message.

In one or more of the above embodiments, retransmissions can (1) be multicast (and ignored or discarded by those sinks that did not need the retransmitted data), (2) be unicast directly to the requesting sinks, or (3) include some combination of multicast and unicast depending on circumstances.

Intelligent Retransmission Requests

In one or more embodiments of the present invention, a sink is aware of its retransmission budget and intelligently determines not only whether or not to request a retransmission but also a scheme to manage its retransmission budget to optimize its performance or the performance of the network. For example, consider a video sink that experiences a multiple-frame burst error while receiving an MPEG-2 video stream. In this scenario, the sink may determine that it lost an intra-coded frame (I frame) followed by six predictively-coded frames (P-frames). As is understood by one skilled in the art, the P-frames are of no use without the preceding I-frame, but the remaining retransmission budget for the sink might not allow for retransmission of all seven frames. Thus, the sink may intelligently decide to request no retransmissions until it has successfully received the next I-frame (which might not be for another few frames yet, depending on the group-of-pictures (GOP) size). This is an example of a sink that assigns different priority levels to different communications and determines how and when to request retransmission based on the relative priority levels. More information on MPEG-2 can be found is ISO/IEC standard 13818-2 "Information technology—Generic coding of moving pictures and associated audio information: Video," incorporated herein by reference in its entirety.

While the present invention has been described using the terms "source" and "sink" to denote a message originator and a message recipient, respectively, this does not imply that the invention is limited to communications systems, such as media communications systems, where such terms are typically used. In general, the invention can be applied to any suitable system, including (without limitation) those where a source is referred to as a "transmitter" and a sink is referred to as a "receiver."

Though the examples in the previous discussion involved video transmission and video display terminals in a wireless network, as would be understood to one skilled in the art, the present invention is not limited to those examples. In particular, the present invention would apply to networks involving any type of data transmission including generic data, video, audio, multimedia, billing, transactional, and voice. Likewise, the present invention is also applicable to wired networks, including, without limitation, those networks conforming to the IEEE 802.3 base and derivative standards, ATM networks, fiber distributed data interface (FDDI) networks, SONET networks, CATV networks, HFC networks, and satellite networks. The IEEE 802.3 standard is described in more detail in "IEEE 802.3 *Standard for Information technology—Telecommunications and information exchange between systems—Local and metropolitan area networks—Specific requirements—Part* 3: *Carrier Sense Multiple Access with Collision Detection* (*CSMA/CD*) *Access Method and Physical Layer Specifications,*" Institute of Electrical and Electronics Engineers (IEEE), 2002, incorporated herein by reference in its entirety.

While this invention has been described with reference to illustrative embodiments, this description should not be construed in a limiting sense. Various modifications of the described embodiments, as well as other embodiments of the invention, which are apparent to persons skilled in the art to which the invention pertains are deemed to lie within the principle and scope of the invention as expressed in the claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A method for managing bandwidth in a communications network having at least a first source and at least a first sink, the method comprising:
   a retransmission budgeting entity (RBE) specifying a retransmission budget for the first sink;
   one of the first sink and the first source determining that the first sink did not successfully receive a communication transmitted from the first source; one of the first sink, the first source, and the RBE determining, based on the retransmission budget, whether to request retransmission of the communication from the first source to the first sink; and
   the RBE dynamically adjusting the retransmission budget based on one or more characteristics of the communications network, wherein the one or more characteristics comprise a number of requests for retransmission transmitted by the first sink, wherein:
   the first sink determines that the communication from the first source was not successfully received;
   the first sink counts its requests for retransmission;
   the first sink compares the retransmission budget with the number of its retransmission requests to determine whether to request retransmission of the communication;
   the first sink transmits to the first source a request for retransmission of the communication only if the request for retransmission would not exceed the retransmission budget; and
   the first sink receives a retransmission of the communication from the first source.

2. The method of claim 1, wherein:
   the communication was originally multicasted or broadcasted to the first node and one or more other nodes; and
   the retransmission of the communication is unicasted to the first node.

3. The method of claim 1, further comprising:
   transmitting, from the first sink to the first source, a request for retransmission of the communication; and
   retransmitting the communication from the first source to the first sink, only if the retransmission of the communication would not exceed the retransmission budget.

4. The method of claim 1, wherein the network has a second sink having a second retransmission budget different from the retransmission budget for the first sink.

5. The method of claim 1, wherein the retransmission budget is calculated based on one or more characteristics of the communications network.

6. The method of claim 5, wherein the one or more characteristics comprise at least one of (i) a buffer depth of the first sink and (ii) a relative priority level for the first sink.

7. The method of claim 1, wherein dynamically adjusting the retransmission budget based on one or more characteristics of the communications network comprises:
   determining the number of requests for retransmission transmitted by the first sink during operation; and
   increasing or decreasing the retransmission budget of the first sink based on the number of requests for retransmission transmitted by the first sink.

8. The method of claim 7, wherein the communications network has a second sink, and the method further comprises:
   specifying a retransmission budget for the second sink;

counting a number of requests for retransmission transmitted by the second sink during operation; and dynamically adjusting the retransmission budget for the second sink based on the number of requests for retransmission by the second sink;

wherein:
if the first sink requests more retransmissions than the second sink, then the retransmission budget for the first sink is adjusted to be greater than the retransmission budget for the second sink; and
if the first sink requests fewer retransmissions than the second sink, then the retransmission budget for the first sink is adjusted to be less than the retransmission budget for the second sink.

9. A first sink for a communications network having at least a first source and at least the first sink, the first sink comprising:

a processor adapted to:
determine that the first sink did not successfully receive a communication transmitted from the first source;
determine, based on the retransmission budget, whether to request retransmission of the communication from the first source to the first sink by: (i) counting its requests for retransmission and (ii) comparing the retransmission budget with the number of its retransmission requests;
transmit a request for retransmission of the communication, only if the request for retransmission would not exceed the retransmission budget, and
receive a retransmission of the communication from the first source, wherein:
the retransmission budget is dynamically adjusted based on one or more characteristics of the communications network; and
the one or more characteristics comprise a number of requests for retransmission transmitted by the first sink.

10. The first sink of claim 9, wherein the first sink is adapted to:
transmit a request for retransmission of the communication from the first source to the first sink; and
suppress additional retransmission requests in response to receipt of a silence command.

11. The first sink of claim 9, wherein the first sink is adapted to:
assign different priority levels to different communications; and
take the priority level of an unsuccessful communication into account in determining whether to request retransmission of the communication.

12. The first sink of claim 9, wherein the retransmission budget is dynamically adjusted based on one or more characteristics of the communications network by:
determining a number of requests for retransmission transmitted by the first sink during operation, and
increasing or decreasing the retransmission budget of the first sink based on the number of requests for retransmission transmitted by the first sink.

13. A method for managing bandwidth in a communications network having at least a first source and at least a first sink, the method comprising:
a retransmission budgeting entity (RBE) specifying a retransmission budget for the first sink;
the first source determining that the first sink did not successfully receive a communication transmitted from the first source;
the first source determining, based on the retransmission budget, whether to retransmit the communication from the first source to the first sink, by: (i) counting a number of requests for retransmission by the first sink and (ii) comparing the retransmission budget with the number of request for retransmission by the first sink;
the first source retransmitting the communication to the first sink, only if the retransmission would not exceed the retransmission budget; and
the RBE dynamically adjusting the retransmission budget based on one or more characteristics of the communications network, wherein the one or more characteristics comprise a number of requests for retransmission transmitted by the first sink.

14. The method of claim 13, wherein:
the first sink is not aware of the transmission budget;
a silence command is transmitted to the first sink if it is determined that the first sink has used the retransmission budget; and
the first sink suppresses additional retransmission request in response to receipt of the silence command.

* * * * *